(12) United States Patent
Almond (10) Patent No.: US 10,183,755 B2
(45) Date of Patent: Jan. 22, 2019

(54) HELICOPTER ROTOR ICING DETECTION SYSTEM AND METHOD

(71) Applicant: Jonathan D. Almond, El Cajon, CA (US)

(72) Inventor: Jonathan D. Almond, El Cajon, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 15/893,143

(22) Filed: Feb. 9, 2018

(65) Prior Publication Data

US 2018/0370639 A1    Dec. 27, 2018

Related U.S. Application Data (62) Division of application No. 14/465,448, filed on Aug. 21, 2014, now Pat. No. 9,957,053.

(51) Int. Cl.
| | |
|---|---|
| *G05D 1/00* | (2006.01) |
| *B64D 15/22* | (2006.01) |
| *B64C 39/02* | (2006.01) |
| *B64D 31/06* | (2006.01) |
| *G05D 1/08* | (2006.01) |
| *B64D 15/20* | (2006.01) |

(52) U.S. Cl.
CPC ............ *B64D 15/22* (2013.01); *B64C 39/024* (2013.01); *B64D 15/20* (2013.01); *B64D 31/06* (2013.01); *G05D 1/0816* (2013.01); *B64C 2201/024* (2013.01); *B64C 2201/141* (2013.01)

(58) Field of Classification Search
CPC .............................. B64D 15/22; B64C 39/024
See application file for complete search history.

(56) References Cited

U.S. PATENT DOCUMENTS

| | | | |
|---|---|---|---|
| 5,484,121 A | 1/1996 | Padawer et al. | |
| 5,869,752 A * | 2/1999 | Klauber ............... | B60G 17/019 |
| | | | 701/101 |
| 6,304,194 B1 | 10/2001 | McKillip | |
| 6,347,767 B1 | 2/2002 | Holmen | |
| 6,879,885 B2 | 4/2005 | Driscoll et al. | |
| 7,398,182 B2 | 7/2008 | Petit | |
| 7,628,359 B2 | 12/2009 | Shah et al. | |
| 8,560,203 B2 | 10/2013 | Calandra et al. | |
| 9,045,226 B2 | 6/2015 | Piasecki et al. | |
| 2003/0135306 A1 * | 7/2003 | Driscoll ................. | B64C 27/12 |
| | | | 701/3 |
| 2004/0206854 A1 | 10/2004 | Shah et al. | |

(Continued)

FOREIGN PATENT DOCUMENTS

GB          2259895 A      3/1993

*Primary Examiner* — Adam M Alharbi
(74) *Attorney, Agent, or Firm* — Tarolli, Sundheim, Covell & Tummino LLP (57) ABSTRACT

A system includes a signal monitor to monitor a time rate of change of a revolutions per minute (RPM) trim signal that is received from an RPM command path to control a velocity of a helicopter rotor. An icing detector detects for the presence of ice accumulation on the helicopter rotor by comparing the time rate of change of the RPM trim signal to a predetermined threshold for the time rate of change.

16 Claims, 5 Drawing Sheets

(56) References Cited

U.S. PATENT DOCUMENTS

2012/0109115 A1* 5/2012 Condie ................ A61B 5/0538
                                                    606/20
2013/0177417 A1   7/2013 Olesen
2014/0037446 A1* 2/2014 Garnett .................. B64D 15/22
                                                    416/1

* cited by examiner

HELICOPTER ROTOR ICING DETECTION SYSTEM AND METHOD

RELATED APPLICATIONS

This is a divisional application claiming priority from U.S. patent application Ser. No. 14/465,448, filed 21 Aug. 2014, which is incorporated herein in its entirety.

This invention was made with Government support under Contract No. N00019-12-C-0126. The Government has certain rights in this invention.

TECHNICAL FIELD

This disclosure relates to helicopters, and more particularly to a system and method to detect the presence of ice on helicopter rotors.

BACKGROUND

Rotor icing is a significant flight safety hazard to helicopters that do not have rotor deicing systems. In manned helicopters, pilots are therefore careful to avoid or quickly exit icing conditions. Helicopter UAVs (unmanned aerial vehicles) are as prone to icing as manned helicopters, but do not have the human pilot's eyes to avoid or quickly detect icing. Commercially available fixed-wing-type ice detectors are slow to sense icing on a helicopter where ice can accrete much faster on rotor blades than on other parts of the airframe. Even small accumulations of rotor ice can quickly lead to loss of control and/or loss of aircraft.

SUMMARY

This disclosure relates to a system and method to detect the presence of ice on helicopter rotors. In one aspect, a system includes a signal monitor to monitor a time rate of change of a revolutions per minute (RPM) trim signal that is received from an RPM command path to control a velocity of a helicopter rotor. An icing detector detects the presence of ice accumulation on the helicopter rotor by comparing the time rate of change of the RPM trim signal to a predetermined threshold for the time rate of change.

In another aspect, a method includes monitoring a revolutions per minute (RPM) trim signal that is received from an RPM command path to control a velocity of a helicopter rotor. The method includes determining a time rate of change for the RPM trim signal. This includes comparing the time rate of change of the RPM trim signal to a predetermined threshold for the time rate of change. The method includes detecting ice accumulation on the helicopter rotor if the time rate of change for the RPM trim signal exceeds a predetermined threshold for the time rate of change.

In yet another aspect, an unmanned aerial vehicle (UAV) includes a UAV controller to control flight operations of the UAV. A rotor revolutions per minute (RPM) controller monitors a collective pitch command path and an RPM command path with respect to a collective pitch command for the collective pitch command path and an RPM command for the RPM command path. The controller generates a fuel control command to control engine speed of the UAV based on the collective pitch command and an RPM signal that is fed back to adjust the RPM command. An icing detector monitors a time rate of change of an RPM trim signal in the RPM command path with respect to a predetermined threshold for the time rate of change. The icing detector notifies the UAV controller of rotor icing if the time rate of change of the RPM trim signal exceeds the predetermined threshold for the time rate of change.

DETAILED DESCRIPTION

This disclosure relates to a system and method to detect the presence of ice on helicopter rotors. An icing detector to detect the presence of ice on helicopter rotors is provided and can operate in conjunction with an RPM controller that controls the speed of helicopter rotors. Various types of rotor drag including rotor induced drag and rotor profile drag are analyzed to determine whether or not ice has accumulated on the helicopter rotors. Rotor induced drag arises from the production of lift in the helicopter. It can be represented by a component of force parallel to the direction of travel of the rotor blade and is a result of an airfoil turning airflow to produce lift. Rotor induced drag is also strongly affected by the angle of attack of the rotor blades. Rotor profile drag arises from viscous and pressure forces acting on its airfoils (e.g., helicopter rotor blades). It is a function of the airfoils' speed through the air, the density of the air, and is mainly affected by the airfoils' shape. Since accumulated ice changes the airfoils' shape, the ability to accurately estimate profile drag allows for the detection of ice accretion.

An RPM trim signal in the RPM controller can be monitored by the icing detector to identify the presence of ice on helicopter rotors. The RPM trim signal is monitored with respect to a time rate of change of the trim signal and can be monitored in an RPM command path to control a velocity of the helicopter rotor. The icing detector detects the presence of ice accumulation on the helicopter rotor by comparing the time rate of change of the RPM trim signal to a predetermined threshold for the time rate of change.

Figure 1:
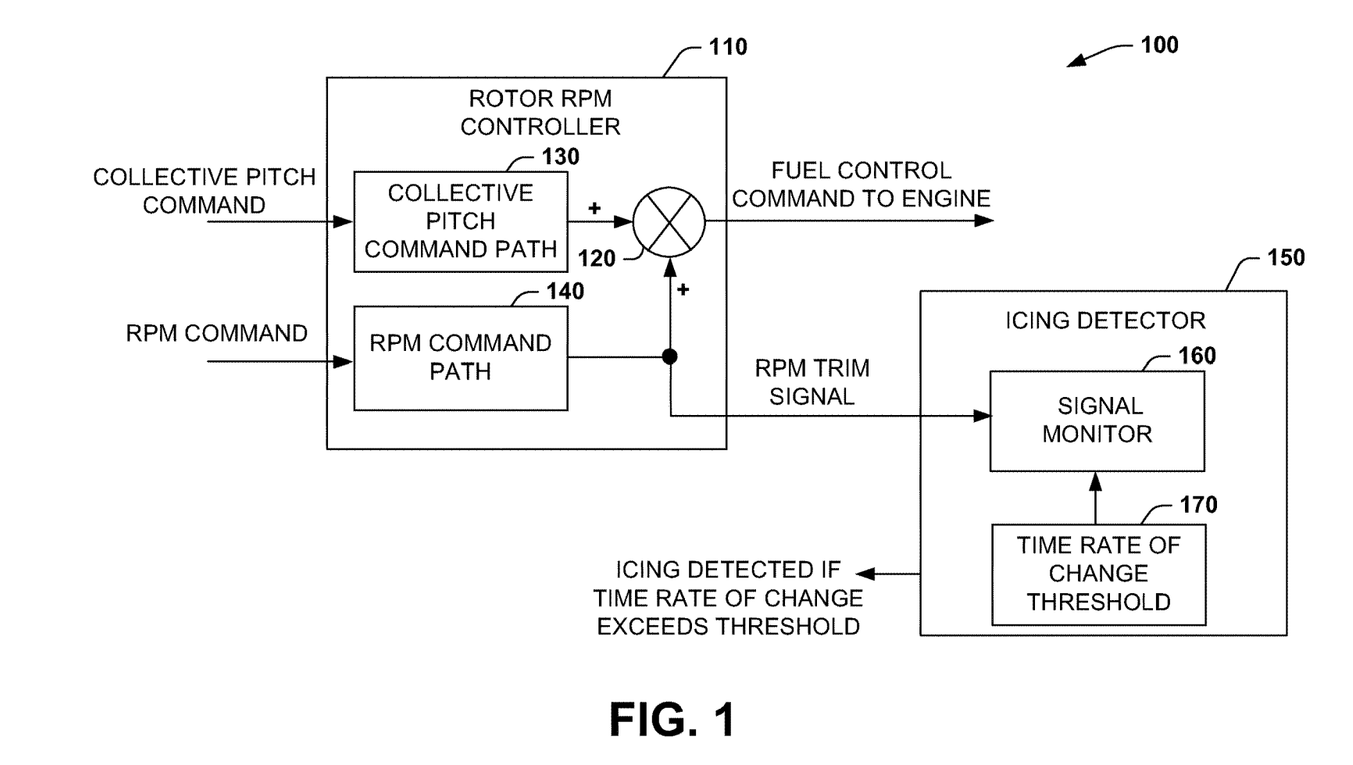
FIG. 1 illustrates an example of a system to detect the presence of ice on helicopter rotors.

FIG. 1 illustrates an example of a system 100 to detect the presence of ice on helicopter rotors. The system 100 includes a rotor revolutions per minute (RPM) controller 110 that controls the speed of a helicopter engine via a fuel control command sent to the engine (See e.g., FIG. 2). The fuel control command is generated at the output of a summing node 120 that combines output from a collective pitch command path 130 and an RPM command path 140. The collective pitch command path 130 receives a collective pitch command (e.g., from a UAV vehicle controller or pilot control) to generate the collective pitch output to the summing node 120. The collective pitch command generally includes a single output from a controller flight control law, or a human pilot, defining collective pitch position. The RPM command is a variable number, and generally constant, defining desired engine RPM speed.

Figure 2:
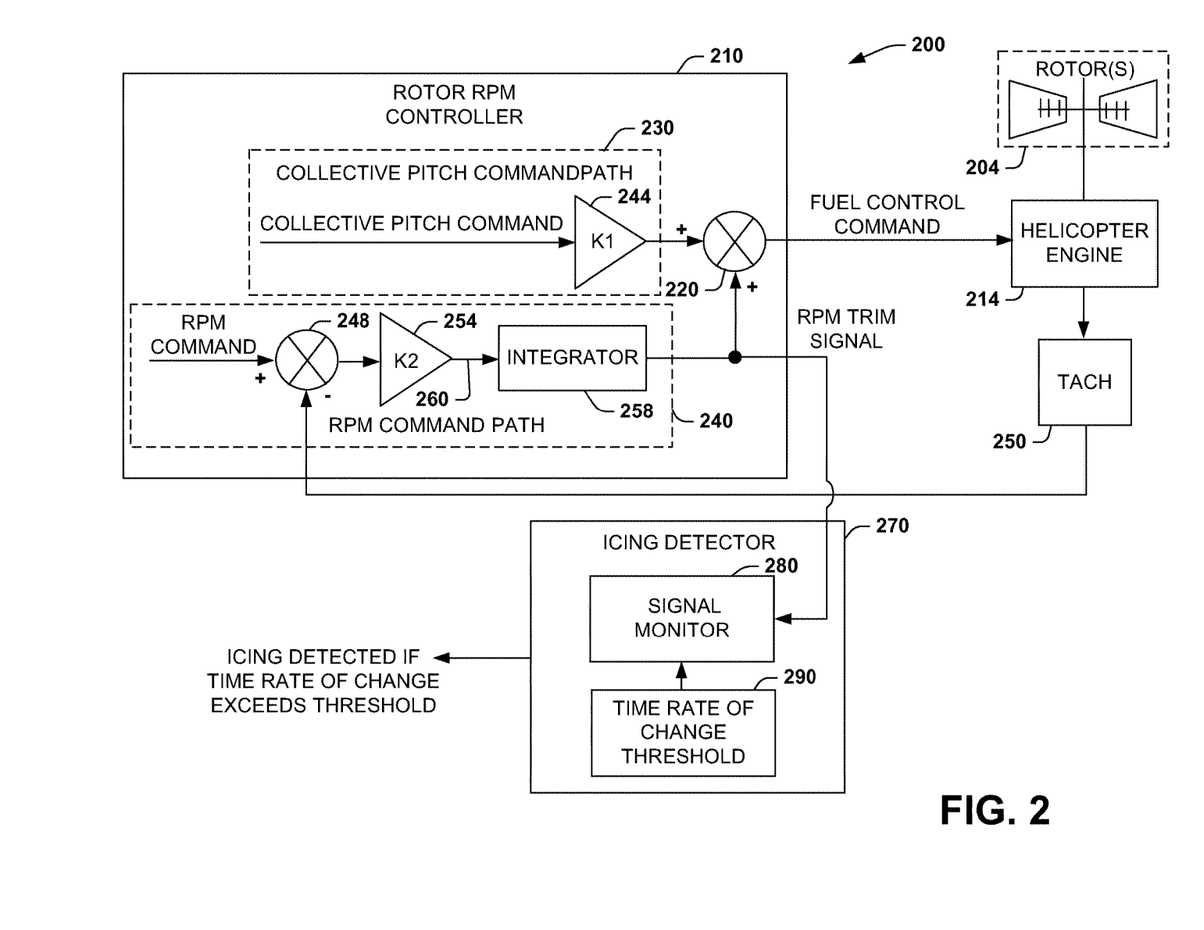
FIG. 2 illustrates an example of a control system to detect the presence of ice on helicopter rotors.

An RPM trim signal is provided at the output of the RPM command path 140 in one example, where the RPM trim signal is derived from a control error signal generated with respect to the RPM command and tachometer feedback from the engine (See e.g., FIG. 2). Although the RPM trim signal is generally monitored at the output of the RPM command path 140, it can also be monitored at other points in the RPM command path (e.g., before or after an integrator that processes the RPM trim signal). In one example, the RPM controller 110 can be implemented as a digital controller to provide the RPM trim signal. Such controllers can include or be part of a Full Authority Digital Engine Control (FADEC) that is a system including a digital computer, called an electronic engine controller (EEC) or engine control unit (ECU), and its related accessories that control substantially all aspects of helicopter engine performance.

As shown, the system 100 includes an icing detector 150 to detect the presence of ice on helicopter rotors. The icing detector includes a signal monitor 160 to monitor a time rate of change of the RPM trim signal that is received from the RPM command path 140 to control velocity of the helicopter rotor. The icing detector 150 detects for the presence of ice accumulation on the helicopter rotor by comparing the time rate of change of the RPM trim signal to a predetermined threshold for the time rate of change at 170. The threshold 170 is generally a positive value and can be processed as a digital value in the icing detector 150 with respect to the monitored RPM trim signal which is also generally a digital value. The time rate of change for the RPM trim signal can be computed in various manners as described below with respect to FIGS. 2 and 3. If the time rate of change for the RPM trim signal is determined to be above the predetermined threshold 170, an icing detected output signal can be generated. This signal could be used to indicate that flight corrective actions should be initiated.

Such corrective actions can include lowering the altitude of the helicopter, and/or changing the direction of the helicopter, for example, to mitigate further accumulation of ice. The RPM trim signal can continue to be monitored by the signal monitor 160. If the time rate of change for the RPM trim signal falls below a second threshold (See e.g., FIG. 4), corrective actions can be stopped (or modified depending on conditions), and the icing detected output signal extinguished. In one example, the icing detected output signal can be sent to a helicopter controller (See e.g., FIG. 5) to institute corrective actions. In another example, the icing detected output signal can be sent as a signal to the cockpit of a piloted vehicle warning the pilot of the presence of ice (e.g., light and/or sound indicating ice detected). In one example, the icing detector 160 can execute as executable instructions that are part of the RPM controller 110 (e.g., software module in FADEC). In another example, the icing detector 160 can execute as a separate module from the RPM controller, where the RPM trim signal is passed from the RPM controller to the icing detector 160 (e.g., icing detector executing as module in UAV controller).

By monitoring the RPM trim signal with respect to a time rate of change threshold 170, the differences between rotor induced drag and rotor profile drag can be discriminated which thus, enables detection of ice accretion. Since accumulated ice changes the airfoil's shape, the ability to accurately estimate profile drag allows for the detection of ice accretion. By monitoring how the RPM trim signal changes over time, the icing detector can isolate the respective rotor profile drag to detect the presence of ice on the helicopter rotor. As used herein, the term rotor includes both the main helicopter rotor(s) to provide lift and, if present, the tail rotor that provides stability to the helicopter by applying an opposing counter-torque to the main helicopter rotor. The main helicopter rotor and tail rotor are generally geared together and rotate in response to the helicopter engine which is controlled by the RPM controller 120 via the fuel control command.

FIG. 2 illustrates an example of a control system 200 to detect the presence of ice on helicopter rotors 204. The system 200 includes a rotor revolutions per minute (RPM) controller 210 that controls the speed of a helicopter engine 214 via a fuel control command sent to the engine. The fuel control command is generated at the output of a summing node 220 that combines output from a collective pitch command path 230 and an RPM command path 240. The collective pitch command path 230 receives a collective pitch command (e.g., from an unmanned vehicle controller or human pilot control) to generate the collective pitch output to the summing node 220. The collective pitch command generally includes a single output from a controller flight control law, or a human pilot, defining collective pitch position. If from a human pilot, it can be measured from a position transducer mounted on the collective control stick of the helicopter. If the collective pitch command is from a flight control law, it can be a digital or analog signal that is also provided to the flight control actuators. As shown, the collective pitch command can be scaled through first gain component 244 (e.g., analog or digital gain) having a gain shown as K1.

The RPM command is a variable number, generally constant, defining desired engine RPM speed. An RPM trim signal is provided at the output of the RPM command path 240 in one example, where the RPM trim signal is derived from a control error signal generated via error node 248 with respect to the RPM command and tachometer feedback 250 from the engine 214. Although the RPM trim signal is generally monitored at the output of the RPM command path 240, it can also be monitored at other points in the RPM command path. As shown, output from error node 248 can be fed to a second gain component 254 which drives an integrator 258 to generate the RPM trim signal in one example. In another example, the RPM trim signal can be monitored before the integrator 258 such as shown at node 260, for example. The drive system RPM is the measured engine RPM via feedback 250. The difference of those signals, also known as RPM "error" is fed at 248 to gain K2, and then integrated. The sum of the K2-multiplied and integrated RPM error is summed with the K1-multiplied collective pitch command to form the fuel control command, which is then sent to an electronic or hydro-mechanical fuel flow controller, for example, to control engine speed. The integrator 258 can employ substantially any type of integration method, however, one example employs a discrete time integrator using a Backward Euler method.

As shown, the system 200 includes an icing detector 270 to detect the presence of ice on the helicopter rotors 204. The icing detector 270 includes a signal monitor 280 to monitor a time rate of change of the RPM trim signal that is received from the RPM command path 240 to control velocity of the helicopter rotors 204. The icing detector 270 detects the presence of ice accumulation on the helicopter rotors by comparing the time rate of change of the RPM trim signal to a predetermined threshold for the time rate of change at 290. The threshold 290 is generally a positive value and can be processed as a digital value in the icing detector 270 with respect to the monitored RPM trim signal which is also generally a digital value. If the time rate of change for the RPM trim signal is determined to be above the predetermined threshold 290, an icing detected output signal can be generated indicating that rotor icing has been detected. Generally, when rotor icing is present an increase in the RPM trim signal (e.g., a positive value) is detected. Different computational units for the time rate of change could include RPM/sec, change in % RPM/sec, change in radians/sec^2, and so forth.

The gain K1 for component 244 provides a suitable approximation of fuel flow change required given a change in collective pitch command, particularly over a small range of travel. Thus, K1 can be selected to encompass measured profile as well as induced drag for a given rotor. The bias or "RPM trim" term is provided by the integral of the RPM error signal*K2 of component 254, and under non-iced rotor conditions is expected to remain nearly constant due to the approximation provided by K1. Thus, sudden and/or large changes in K2 times the integral of RPM trim signal without significant change in collective pitch command signal deviation from the known suitable approximation of fuel flow required at a particular collective pitch command, and are indicative of a sudden increase in profile drag consistent with rotor icing.

One example to determine time rate of change for the RPM trim signal includes differencing successive discrete samples for the integral of the RPM error signal at the output of integrator 258. Another example, includes providing a filter (See e.g., FIG. 3 below) to ignore a slow-changing signal but respond to a rapid change. A third example to determine the time rate of change would be to monitor the RPM error signal at 260, i.e., the integrand, directly, since by definition it is the time rate of change of the integrated signal.

Figure 3:
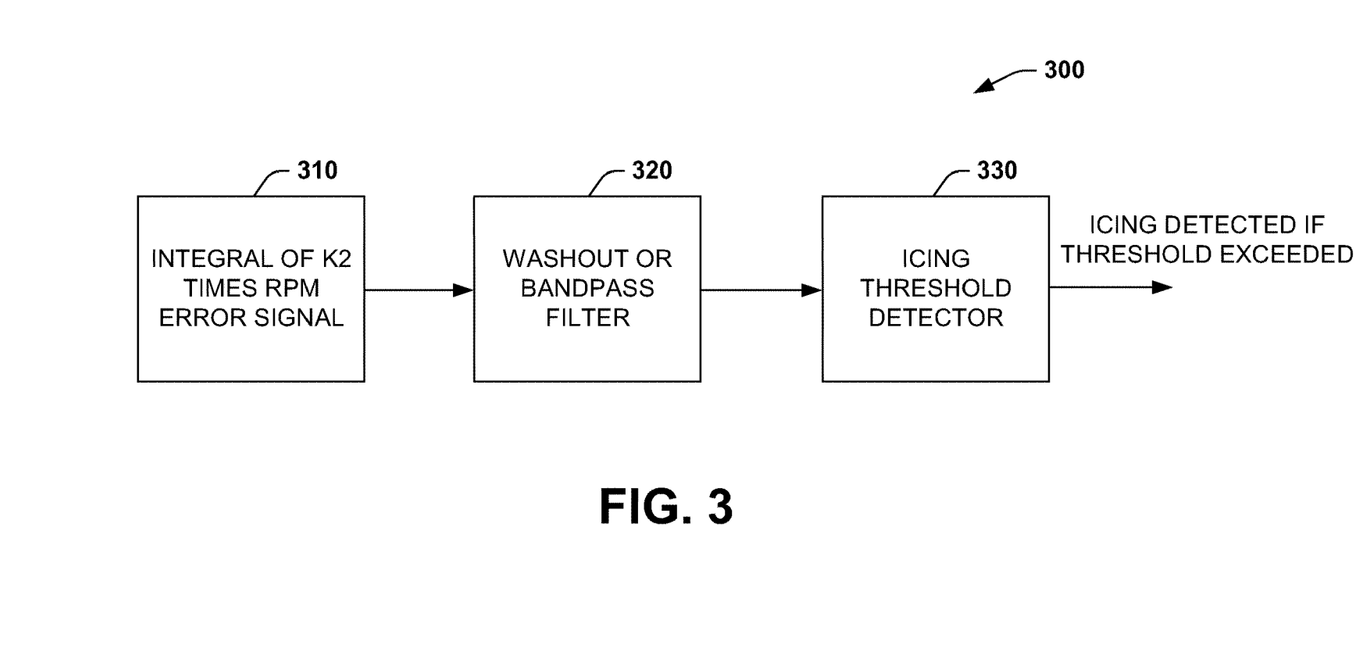
FIG. 3 illustrates an example method to analyze an RPM trim signal for detecting ice on helicopter rotors.
Figure 4:
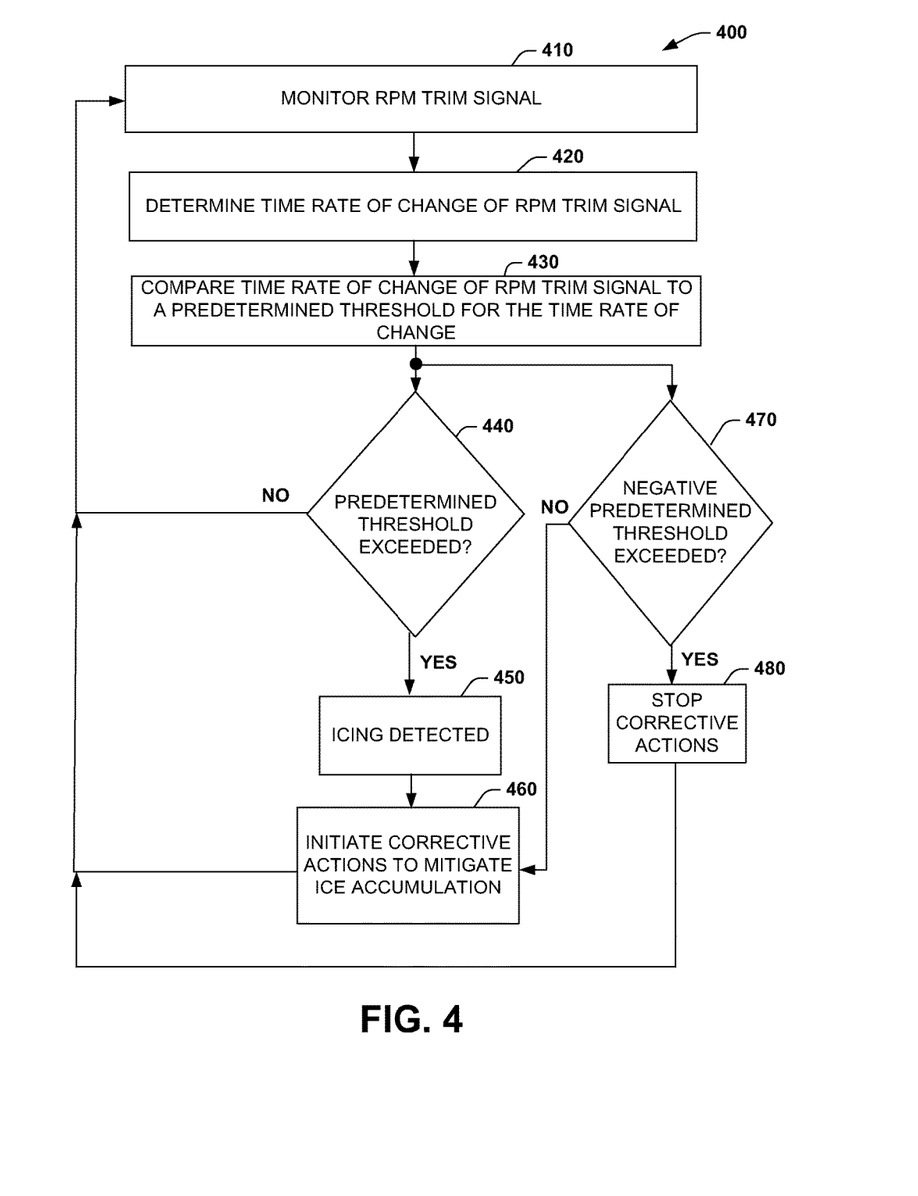
FIG. 4 illustrates an example of a method to detect the presence of ice on helicopter rotors.

In view of the foregoing structural and functional features described above, a methodology in accordance with various aspects of the present invention will be better appreciated with reference to FIGS. 3 and 4. While, for purposes of simplicity of explanation, the methodology is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention. The various acts of the method can be executed automatically such as via a processor, computer, and/or controller configured with executable instructions to carry out the various acts or commands described herein.

FIG. 3 illustrates an example method 300 to analyze an RPM trim signal for detecting ice on helicopter rotors. At 310, the integral of the K2*RPM error signal described above with respect to FIG. 2 is fed into a high-pass washout or band-pass filter 320, with coefficients to be determined, sensitive to the frequency range of interest for ice detection. The filter's characteristics can be determined analytically and validated experimentally using flight test data, for example. The filter outputs provide approximate time rate of change of the integrated RPM trim signal. A similar determination could be achieved directly by measuring the RPM error signal described above however that signal may not be as readily available in analyzed flight test data. Output from the filter 320 can be sent to an icing threshold detector to detect the presence of ice when the time rate of change exceeds a predetermined threshold (e.g., measured RPM/sec from filter detected above a threshold specifying maximum RPM/sec).

FIG. 4 illustrates an example of a method 400 to detect the presence of ice on helicopter rotors. At 410, the method includes monitoring a revolutions per minute (RPM) trim signal that is received from an RPM command path to control a velocity of a helicopter rotor (e.g., via signal monitor 160 of FIG. 1). At 420, the method 400 includes determining a time rate of change for the RPM trim signal (e.g., via icing detector 150 of FIG. 1). At 430, the method 400 includes comparing the time rate of change of the RPM trim signal to a predetermined threshold setting for the time rate of change (e.g., via icing detector 150 of FIG. 1). At 440, the method includes detecting ice accumulation on the helicopter rotor if the time rate of change for the RPM trim signal exceeds a predetermined threshold (e.g., positive threshold) for the time rate of change (e.g., via icing detector 150 of FIG. 1). If the threshold is not exceeded at 440, the method proceeds back to 410 and maintains normal flight operations (or returns to normal flight operations after icing procedures implemented. If the threshold is exceeded at 440, the method proceeds to 450 and generates a signal flag that icing has been detected on the helicopter rotor blades.

At 460, the method includes implementing initiating corrective actions upon icing being detected at 450. As noted above, such corrective actions can include lowering the altitude of the helicopter, and/or changing the direction of the helicopter, for example, to mitigate further accumulation of ice. As shown, a second processing path at 470 can be executed (e.g., after icing is initially detected) to determine if the corrective actions initiated at 460 should be terminated. A negative predetermined threshold can be analyzed at 470. The negative threshold represents a negative time rate of change for the RPM trim signal that occurs as icing conditions improve. If the negative threshold is not exceeded at 470, the method proceeds to 460 and continues with corrective actions to mitigate ice accumulation. If the negative threshold is exceeded at 470, corrective actions can be stopped (e.g., flag set to turn off corrective actions by controller).

Figure 5:
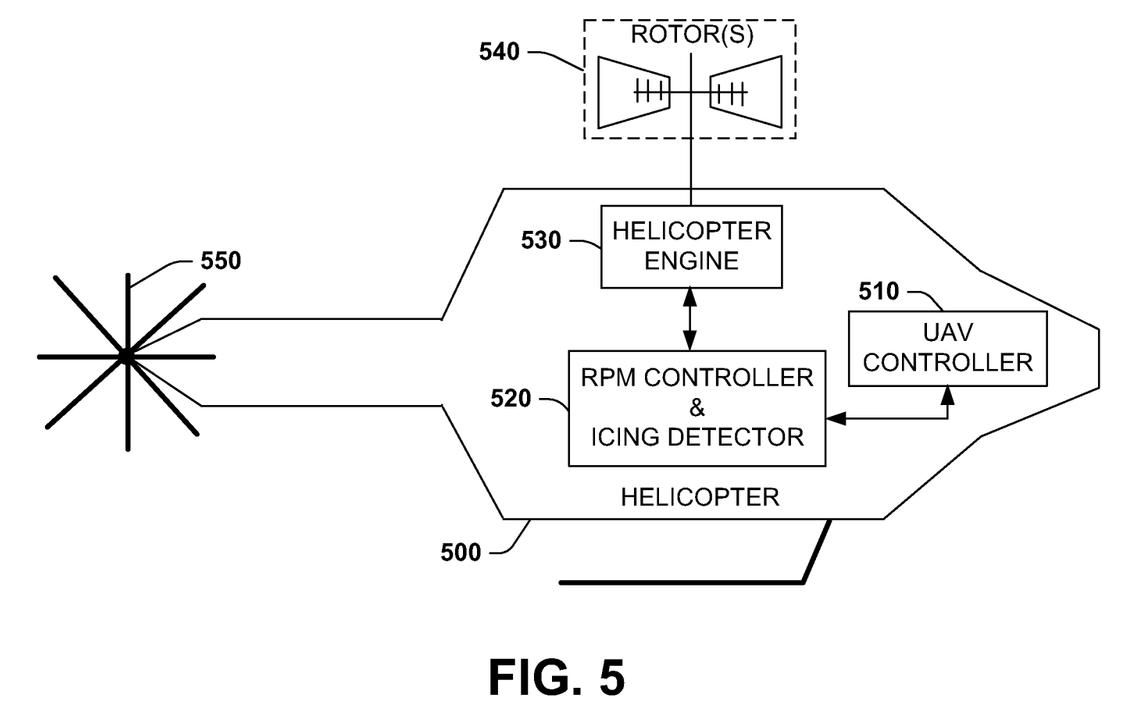
FIG. 5 illustrates an example of an unmanned aerial vehicle (UAV) that employs an icing detector to detect the presence of ice on helicopter rotors.

FIG. 5 illustrates an example of an unmanned aerial vehicle (UAV) 500 that employs an icing detector to detect the presence of ice on helicopter rotors. In this example, the UAV 500 includes a UAV controller 510 to control flight operations of the UAV. An RPM controller 520 monitors a collective pitch command path and an RPM command path with respect to a collective pitch command for the collective pitch command path and an RPM command for the RPM command path. The RPM controller generates a fuel control command to control engine speed of the UAV's engine 530 based on the collective pitch command and an RPM signal that is fed back to adjust the RPM command (See e.g., FIG. 2 above). The engine 530 operates a main rotor 540 which is internally geared to a stabilizing tail rotor 550.

An icing detector in the RPM controller 520 monitors a time rate of change of an RPM trim signal in the RPM command path with respect to a predetermined threshold for the time rate of change. The icing detector in the RPM controller 520 notifies the UAV controller 510 to initiate corrective actions for the UAV if the time rate of change of the RPM trim signal exceeds the predetermined threshold for the time rate of change. As noted above with respect to FIG. 4, if the time rate of change falls below a second threshold (e.g., negative time rate of change threshold) the icing corrective actions can be terminated.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. An unmanned aerial vehicle (UAV), comprising:
   a UAV controller to control flight operations of the UAV;
   a rotor revolutions per minute (RPM) controller to monitor a collective pitch command path and an RPM command path with respect to a collective pitch command for the collective pitch command path and an RPM command for the RPM command path, the controller generates a fuel control command to control engine speed of the UAV based on the collective pitch command and an RPM signal that is fed back to adjust the RPM command and;
   an icing detector to monitor a time rate of change of an RPM trim signal in the RPM command path with respect to a predetermined threshold for the time rate of change, the icing detector notifies the UAV controller to initiate corrective actions for the UAV if the time rate of change of the RPM trim signal exceeds the predetermined threshold for the time rate of change.

2. The UAV of claim 1, the RPM command path further comprising an error node to generate an error signal based on the RPM command fed to the RPM command path and a feedback signal representing engine speed of a helicopter engine, the RPM command and the feedback signal subtracted at the error node to generate the error signal.

3. The UAV of claim 1, the collective pitch command path further comprising a first gain component having a first gain to scale the collective pitch command applied to the collective pitch path.

4. The UAV of claim 3, further comprising a second gain component having a second gain to scale the RPM command into an output signal.

5. The UAV of claim 4, further comprising an integrator to integrate the output signal into an integrated output signal to supply the RPM trim signal.

6. The UAV of claim 5, wherein the output signal or the integrated output signal are employed to determine the time rate of change for the RPM trim signal.

7. The UAV of claim 5, further comprising a differencing component to perform differencing of successive discrete samples of the integrated output signal to determine the time rate of change for the RPM trim signal.

8. The UAV of claim 1, further comprising a filter that includes a band pass or washout function to determine the time rate of change for the RPM trim signal.

9. A method, comprising:
   controlling flight operations of an unmanned aerial vehicle (UAV);
   monitoring a collective pitch command path and an RPM command path with respect to a collective pitch command for the collective pitch command path and an RPM command for the RPM command path;
   generating a fuel control command to control engine speed of the UAV based on the collective pitch command and an RPM signal that is fed back to adjust the RPM command; and
   monitoring a time rate of change of an RPM trim signal in the RPM command path with respect to a predetermined threshold for the time rate of change; and
   initiating corrective actions for the UAV if the time rate of change of the RPM trim signal exceeds the predetermined threshold for the time rate of change.

10. The method of claim 9, the RPM command path further comprising an error node to generate an error signal based on the RPM command fed to the RPM command path and a feedback signal representing engine speed of a helicopter engine, the RPM command and the feedback signal subtracted at the error node to generate the error signal.

11. The method of claim 9, the collective pitch command path further comprising a first gain component having a first gain to scale the collective pitch command applied to the collective pitch command path.

12. The method of claim 11, further comprising a second gain component having a second gain to scale the RPM command into an output signal.

13. The method of claim 12, further comprising integrating the output signal into an integrated output signal to supply the RPM trim signal.

14. The method of claim 13, further comprising determining the time rate of change for the RPM trim signal based on the output signal or the integrated output signal.

15. The method of claim 13, further comprising performing differencing of successive discrete samples of the integrated output signal to determine the time rate of change for the RPM trim signal.

16. The method of claim 9, further comprising determining the time rate of change for the RPM trim signal based on a band pass or washout function.

* * * * *